United States Patent [19]

Roziere

[11] Patent Number: 4,933,562
[45] Date of Patent: Jun. 12, 1990

[54] MULTIPLE-RADIATION DETECTOR PARTICULARLY FOR X-RAYS WITH TWO ENERGY LEVELS

[75] Inventor: Guy Roziere, Voreppe, France
[73] Assignee: Thomson-CSF, Paris, France
[21] Appl. No.: 254,594
[22] Filed: Oct. 7, 1988
[30] Foreign Application Priority Data Oct. 9, 1987 [FR] France ................................ 87 13963

[51] Int. Cl.$^5$ .............................................. G01T 1/20
[52] U.S. Cl. .................................... 250/367; 250/366; 250/486.1
[58] Field of Search ..................... 250/367, 366, 363.1, 250/486.1, 487.1; 378/44, 45

[56] References Cited

U.S. PATENT DOCUMENTS 3,904,872 9/1975 Ebukuro et al. .................... 250/367

FOREIGN PATENT DOCUMENTS 0115125 8/1984 European Pat. Off. .
0212836 3/1987 European Pat. Off. .
2023285 12/1979 United Kingdom .

Primary Examiner—Carolyn E. Fields
Assistant Examiner—David P. Porta
Attorney, Agent, or Firm—Oblon, Spivak, McClelland, Maier & Neustadt

[57] ABSTRACT

Disclosed are detectors, of the type comprising scintillators, enabling the detection of radiation with different energy levels. The scintillator used in the case of a double energy X-ray detector consists of two materials, one sensitive to high-energy radiation and the other sensitive to low-energy radiation, the former emitting green radiation and the latter emitting red radiation. These radiations are spatially separated by green and red filters before being measured by photodiodes.

11 Claims, 1 Drawing Sheet

MULTIPLE-RADIATION DETECTOR PARTICULARLY FOR X-RAYS WITH TWO ENERGY LEVELS

BACKGROUND OF THE INVENTION

1. Field of the Invention

The invention concerns detectors used to detect radiation with different energies and, notably, detectors of X-rays with at least two different energy levels.

2. Description of the Prior Art

X-rays are commonly used in radiology to examine materials because their attenuation depends on their energy and on a coefficient which is characteristic of the material examined for this energy The X-rays that are given by the emission tubes have a fairly extensive energy spectrum so that the radiation transmitted by the materials examined contains a wide variety of information on said materials. A part of this diversity is lost when the radiation transmitted is applied to a single detector which has a defined function of sensitivity depending on the energy. Thus, with a single detector, the fact that high energy levels are more representative of absorption by heavy materials cannot be used to reveal, in the transmitted radiation, the nature of the materials transmitted. On the contrary, if two detectors are placed in the path of the transmitted rays, said two detectors having maximum sensitivity levels for different energy values, one of the energy values being more representative of one of the constituents of the material examined, it then becomes possible, after weighting the detected signal by suitable coefficients and subtracting said weighted signals, to remove the effect of this material. Thus, in a medical picture of the thorax, it is possible to make the skeleton disappear and highlight other organs.

The simultaneous use of two detectors with different sensitivities is known, and detectors of this type are called "double energy" detectors, and are made, for example, by superimposing two detectors. A first detector is arranged to receive all the radiation transmitted so as to detect the low energy rays and transmit, to a second underlying detector, only those rays that have greater energy. To this effect, the first detector is planned for energy of 20 to 30 kev and uses, for example, an yttrium oxysulphide or an oxide, sometimes a lanthanum oxysulphide, while the latter is designed for energy values of 40 to 100 kev and uses, for example, gadolinium oxysuphide, calcium tungstate or cadmium tungstate.

To enable a radiological system having a double energy detector to work properly, it is necessary to obtain and maintain, for all the angles of incidence, a perfect alignment of the focus of the X-ray tube, the element observed, and the two detectors with equal precision to within the dimension of the smallest element that can be observed. This geometrical imperative is difficult to achieve and maintain over a period of time, and is expensive. Furthermore, in the case of X-ray tubes with rotating anodes, it is also necessary to take into account a certain degree of fluctuation in the original point of the X-rays.

In another embodiment of the prior art, the two detectors are placed side by side. In this case, in the processing of the signals received from each detector, it is necessary to take into account the divergence between the two detectors which do not perceive the same thing at the same instant. Furthermore, even by performing this divergence correction, there is nonetheless a source of error which remains, because the parts of the human body which are examined do not stay completely still during the period of movement corresponding to the divergence of the detectors.

SUMMARY OF THE INVENTION

An aim of the present invention, therefore, is to make a double-energy X-ray detector which does not have the above-mentioned drawbacks of prior art detectors.

Increasingly, analyzers of objects are being used wherein the radiation employed consists not of X-rays but of gamma rays or, again, of a flow of neutrons which are absorbed to varying degrees, depending on the nature of the components of the object and of the energy contained in the incident radiation. In these analyzers, the detectors are also made with a scintillator which converts the radiation transmitted by the object into a transmission of another wavelength, the intensity of this transmission being measured. In this field, it also appears to be worthwhile to use double-energy detectors so as to collect the maximum amount of information on the object examined, and the only way to make these detectors is to combine two detectors as described above for X-rays.

Another aim of the present invention is to make a double-energy detector type of gamma radiation detector or neutron flux detector, using a single detector and a single scintillator.

In general, the aim of the invention is to make a multiple-radiation detector which enables the detection of several types of radiation with different energy levels in using a single detector including a single scintillator.

SUMMARY OF THE INVENTION

The invention relates to a multiple-radiation detector, comprising:

a scintillator which, in response to the reception of a determined number N of radiations corresponding to different energy levels, transmits a same number N of radiations with different wavelengths;

a filtering device which makes a spatial selection of said N radiations emitted by the scintillator, and a photosensitive device which receives the N spatially arranged radiations and gives at least N electrical signals representing intensities of said N spatially arranged radiations.

The scintillator is made up of a mixture of N luminescent materials, each material being sensitive to only one of N incident radiations and each emitting in a different wavelength.

The photosensitive device consists of several photosensitive cells, such as photodiodes, which are arranged in groups of N cells, each group of a cell being assigned to the detection of one of N radiations transmitted by the scintillator.

The N radiations transmitted by the scintillator are separated spatially by as many elementary filtering cells as there are photosensitive cells, said elementary filtering cells being also arranged in groups of N, each elementary filtering cell being designed, firstly, so as to transmit only one of the N radiations emitted by the scintillator and, secondly, so that one photosensitive cell of a group receives only one of the N radiations emitted by the scintillator.

BRIEF DESCRIPTION OF THE DRAWING

Other features and advantages of the present invention will appear from the following description of a special embodiment, said description being made with reference to the appended figures, of which.

DETAILED DESCRIPTION OF THE INVENTION

Figure 1:
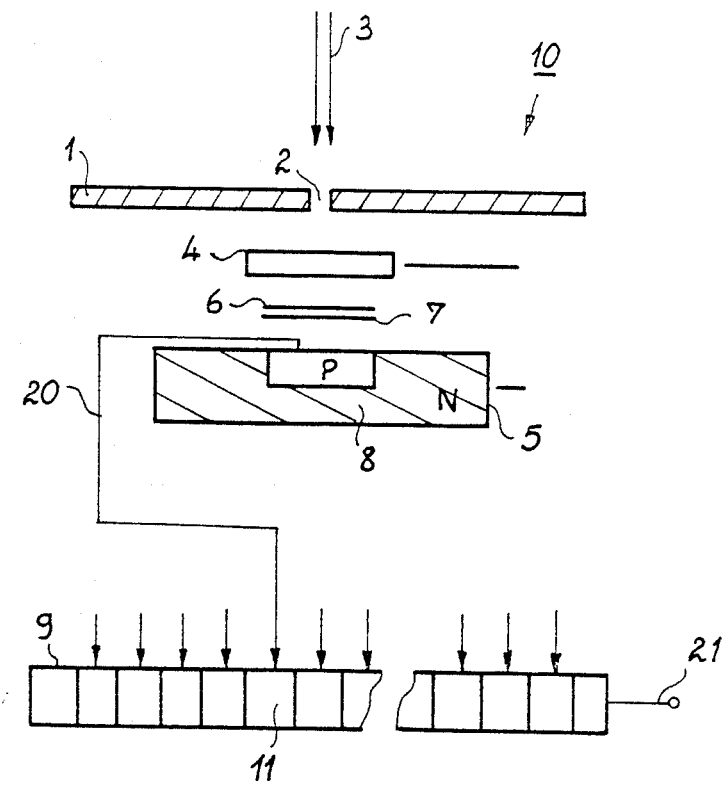
FIG. 1 is a functional schematic drawing, partly in cross-section and partly in longitudinal section, of a double-energy detector according to the present invention.

A double-energy detector 10 according to the present invention consists of an array or casing (not shown) having the width of the object to be analyzed, for example, a human body. This array has the following elements starting from the upper part which receives the X-rays which have gone through the objects to be analyzed. First of all, a layer of lead 1 which is drilled, throughout the length of the array, with a collimation slit 2 for the X-rays shown by the double arrow 3. According to the present invention, a single scintillator 4 is placed beneath the collimation slit 2 and the elements composing it will be described with respect to FIG. 2. The scintillator 4 covers an alignment of photodiodes 5, of which the FIG. 1 cross-section shows only one in the form of a P-N junction, with the layer N forming the substrate 8. Two filters, 6 and 7, are interposed between the alignment of the photodiodes 5 and the scintillator 4. The transmission bands of these filters depend on the composition of the scintillator 4. Finally, a charge transfer device 9, shown in longitudinal section, having the length of the alignment of the photodiodes 5, is placed beneath the alignment of photodiodes and is connected to it electrically so that each photodiode is connected to one cell of the charge transfer device 9, for example by a conductor 20. The conductor 20 thus connects the part P of the P-N junction of a photodiode to the input electrode of a cell 11 of the charge transfer device 9. An output terminal 21 of this device is connected to an electronic pre-processing circuit (not shown).

Figure 2:
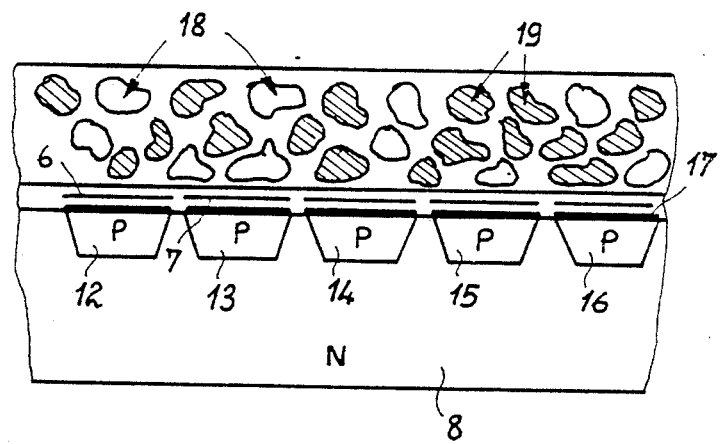
FIG. 2 is a detailed longitudinal sectional view of a part of the scintillator and of the photodiodes of the double-energy detector according to the invention.

The longitudinal sectional view of FIG. 2 gives a more precise view of the arrangement of the scintillator, the filters and the photodiodes.

The scintillator 4 is a layer which has, for example, a thickness of a few hundreds of microns and consists of a mixture of two powders, for example. Each of these powders has the specific feature firstly, of having maximum sensitivity in a certain range of energy of the received X-radiation and, secondly, of emitting a radiation with a different wavelength. Thus, one of the powders is, for example, europium-doped yttrium oxide with an optimum sensitivity to X-rays of 20 kev and emitting red light with a wavelength of 0.61 microns. The other powder is, for example, terbium-doped gadolinium oxysulphide with an optimal sensitivity to X-rays of 50 kev and emitting green light with a wavelength of 0.54 microns.

The alignment of photodiodes 5 is formed on the N type silicon substrate 8, on the upper surface of which a succession of P type zones 12 to 16 is made so as to obtain the same number of P-N junctions. It is on this upper face of the substrate 8 that the connecting metallic electrodes (reference 17) are placed. There is one connecting metallic electrode per diode. On these connecting metallic electrodes, there will be soldered conductors such as the one marked 20 (FIG. 1). In a known way, these electrodes are transparent to red and green radiation from the scintillator 4.

It is on these electrodes that the filters 6 and 7 are made. One of these electrodes, 6, lets through only red light while the other, 7, lets through only green light. It is thus that the photodiode 12 is coveed with a red filter while the adjacent photodiode 13 is covered with a green filter and so on for all the photodiodes of the alignment. Thus, there is an alternation of red and green filters. This type of an arrangement of filters may be obtained, for example, by photo-etching and depositing appropriate organic layers which let though only red light and green light. It will be observed that these filters 6 and 7 are substantially in one and the same plane unlike the arrangement shown in FIG. 1.

As described above in relation to FIG. 1, the layer of the scintillator 4 is placed on the layer consisting of the red and green filters and is formed by the grains of terbium-doped gadolinium oxysulphide powder grains 18 and the grains of europium-doped yttrium oxide powder 19.

The methods to be applied to make the double energy detector just described are known to those skilled in the art and can be applied, for example, to make retinas for solid state color television camera. These techniques can be used to manufacture photodiodes and associated filters with surface dimensions of about one micron to several millimeters.

The choice of the surface dimensions of the diodes will essentially depend on the precision of the analysis to be made. Thus, for a precision of analysis of 0.2 millimeters, the two adjacent photodiodes will have to cover an area of 0.2 millimeters square, namely a dimension, for each photodiode, of 0.1 millimeters along the length of the array and 0.2 millimeters along its width. This results from the fact that each point of the object to be imagined should be capable of analysis by two adjacent photodiodes.

This dimension of the photodiodes determines the maximum thickness of the layer of the scintillator for the thicker this layer, the greater is the diffusion that it introduces, thus causing a reduction in precision. An empirical formula leads to a layer thickness which does not exceed three times the dimension of the photodiode, namely 0.3 millimeters in the above-mentioned example.

In the particular embodiment that has just been described, the use of europium-doped yttrium oxide has been indicated for low-energy X-rays. This oxide can be replaced by europium-activated yttrium oxysulphides which also have a red emission. It is also possible to use terbium-activated yttrium oxide, which has a green emission, and zinc sulphides, which have a blue emission.

For higher-energy X-rays, the terbium-doped gadolinium oxysulphide can be replaced by cadimium tungstates which also have a green emission and calcium tungstate which, on the contrary, has a blue emission.

As indicated above, among these different materials, it is necessary to choose two of them which have different emissions and different optimum sensitivity levels.

The special embodiment which has been described has two materials for one double energy detector but it will be understood that a triple energy detector can be made by a judicious choice of the materials forming the scintillator.

Of course, the photodiodes and the associated filters should be designed accordingly to perform the measurements of the different light radiations emitted by the scintillator. Thus, for a triple energy detector, it will be necessary to have three filters and three photodiodes for each point of elementary analysis.

Besides, no assumption has been made on the sensitivity of the photodiodes according to the radiation, but it is clear that the performance characteristics of the detector can be improved by making photodiodes with different sensitivity depending on the radiation which they have to detect.

In the description, the invention has been taken to apply to X-ray detectors, especially in medical radiology, but it can also be applied to detectors of other forms of radiation such as gamma and neutronic radiation provided, of course, that the materials chosen for the scintillator are sensitive to these forms of radiation and emit different types of radiation.

What is claimed is:

1. A multiple-radiation detector, comprising:
   a single scintillator which, in response to the reception of a determined number N of radiations corresponding to different energy levels, emits a same number N of radiations with different wavelengths;
   a filtering device which makes a spatial selection of said N radiations emitted by the scintillator, and
   a photosensitive device which receives the N spatially arranged radiations and gives at least N electrical signals representing intensities of said N spatially arranged radiations.

2. A multiple-radiation detector according to claim 1 further comprising a charge transfer device which receives the electrical signals given by the photosensitive device.

3. A multiple-radiation detector according to claim 1 or 2 wherein the scintillator comprises a mixture of N luminescent materials, each material being sensitive to only one of the N incident radiations and each emitting in a different wavelength.

4. A multiple-radiation detector according to claim 1 or 2 wherein the photosensitive device consists of several photosensitive cells which are arranged in groups of N cells, each cell of a group being assigned to the detection of one of the N radiations emitted by the scintillator.

5. A multiple-radiation detector according to claim 1 or 2 wherein the filtering device consists of several elementary filtering cells arranged in groups of N, each elementary filtering cell being designed to transmit only one of the N radiations emitted by the scintillator.

6. A multiple-radiation detector according to claim 5 wherein each elementary filtering cell of a group is associated with a photosensitive cell of one and the same group of photosensitive cells, so that a photosensitive cell of a group receives only one of the N radiations emitted by the scintillator.

7. A multiple-radiation detector according to claim 4, wherein the photosensitive cells of a group are each connected to a cell of a charge transfer device associated with this group so as to be able to process, in parallel, the signals corresponding to one and the same radiation.

8. A multiple-radiation detector according to claim 6 wherein the photosensitive cells are photodiodes placed side by side and wherein the N photodiodes of a group have a total reception area of N radiations equal to that of the smallest area to be examined.

9. A multiple-radiation detector according to claim 8 wherein the filtering cells are materials of appropriate color deposited on each of the reception surfaces of said photodiodes.

10. A multiple-radiation detector according to claim 9 wherein the mixture forming the scintillator is deposited on the filtering cell.

11. A multiple-radiation detector according to claim 10, comprising a double-energy X-ray detector with two luminescent material in said single scintillator wherein one of the two luminescent materials is for the high-energy radiation and comprises of radmium tungstate or terbium-doped gadolinium oxysulphide or, again, calcium tungstate and, wherein the other luminescent material for the low-energy radiations and comprises one of terbium-activated lanthanum oxysulphide or yttrium oxysulphide or europium-activated yttrium oxysulphides or oxides or, again, zinc sulphides, the components of a pair being chosen so that their luminescent emissions are different so that they can be separated spatially by said filtering device.

* * * * *